United States Patent
Atkinson et al.

[11] Patent Number: 6,137,862
[45] Date of Patent: Oct. 24, 2000

[54] FAILOVER MECHANISM FOR COMPUTER/TELEPHONY INTEGRATION MONITORING SERVER

[75] Inventors: Wesley J. Atkinson, Woodland Park; Craig A. Baxter; Gopi K. Shankar, both of Colorado Springs; Liqun Wang, Fort Collins, all of Colo.

[73] Assignee: MCI Communications Corporation, Washington, D.C.

[21] Appl. No.: 09/039,612

[22] Filed: Mar. 16, 1998

[51] Int. Cl.[7] ................................. H04M 3/22
[52] U.S. Cl. .......................... 379/34; 379/112; 379/265
[58] Field of Search .................. 379/34, 35, 112, 379/265, 266

[56] References Cited

U.S. PATENT DOCUMENTS

| | | | |
|---|---|---|---|
| 3,643,034 | 2/1972 | Burns et al. | 179/27 D |
| 4,510,351 | 4/1985 | Costello et al. | 379/112 X |
| 4,797,911 | 1/1989 | Szlam et al. | 379/67 |
| 4,829,563 | 5/1989 | Crockett et al. | 379/309 |
| 4,837,799 | 6/1989 | Prohs et al. | 379/224 |
| 4,881,261 | 11/1989 | Oliphant et al. | 379/215 |
| 4,894,857 | 1/1990 | Szlam et al. | 379/67 |
| 4,896,345 | 1/1990 | Thorne | 379/67 |
| 5,101,425 | 3/1992 | Darland et al. | 379/34 |
| 5,155,763 | 10/1992 | Bigus et al. | 379/113 |
| 5,214,688 | 5/1993 | Szlam et al. | 379/67 |
| 5,247,569 | 9/1993 | Cave | 379/113 |
| 5,309,505 | 5/1994 | Szlam et al. | 379/88 |
| 5,448,632 | 9/1995 | Iyob et al. | 379/112 X |
| 5,465,286 | 11/1995 | Clare et al. | 379/34 |
| 5,467,391 | 11/1995 | Donaghue, Jr. et al. | 379/265 |
| 5,535,256 | 7/1996 | Maloney et al. | 379/112 X |
| 5,621,789 | 4/1997 | McCalmont et al. | 379/113 X |
| 5,696,811 | 12/1997 | Maloney et al. | 579/34 |
| 5,790,635 | 8/1998 | Dezonno | 379/34 |
| 5,790,798 | 8/1998 | Beckett, II et al. | 379/342 |
| 5,818,907 | 10/1998 | Maloney et al. | 379/34 |
| 5,854,825 | 12/1998 | Mukaihara et al. | 379/34 |

FOREIGN PATENT DOCUMENTS

| | | |
|---|---|---|
| 2041882 | 5/1991 | Canada . |
| 0 340 665 A2 | 11/1989 | European Pat. Off. ......... H04M 3/36 |

*Primary Examiner*—Creighton Smith

[57] ABSTRACT

A monitoring system includes multiple redundant processes for gathering and archiving information. The processes are well adapted for use within a call center which has multiple agents for processing inbound/outbound calls. The information concerns the calling activity of the agents. One of the processes is designated as a primary process for providing archived information to clients. The other processes are redundant secondary processes which assume the role of the primary process upon failure of the primary process. Once a failed process is reinitiated, a data synchronization mechanism is used to reconcile data to ensure that each of the processes has current and up-to-date information.

35 Claims, 7 Drawing Sheets

FAILOVER MECHANISM FOR COMPUTER/TELEPHONY INTEGRATION MONITORING SERVER

TECHNICAL FIELD

The present invention relates generally to telecommunications networks and more particularly to a failover mechanism for a computer/telephony integration monitoring server.

BACKGROUND OF THE INVENTION

The popularity of call centers has increased dramatically. A typical call center includes a number of agents who field inbound telephone calls and place outbound telephone calls. Each agent has an associated station that includes a personal computer, a phone pad and a headset. The agent may place outbound sales calls to a potential customer or field inbound calls (such as 800 number calls) from potential customers. The agents are typically organized into groups and have associated supervisors who are responsible for managing the agent. Each agent may receive or place calls from different business clients. For example, a first agent may field calls for an 800 number associated with company A and a second agent may field calls for an 800 number associated with company B.

One of the difficulties that has arisen in such call centers is the difficulty in monitoring the phone activity of the agents. Specifically, it has been difficult for a supervisor to obtain useful information about the activities of the agents in a timely fashion. The computer/telephony integration monitoring server (CTIMS) described in copending application No. 08/940,547 entitled "Computer/Telephony Integration Monitoring Server," which was filed on Sep. 30, 1997, serves as an integral portion of a computerized monitoring system that monitors activities of agents within a call center. The monitoring system may gather status information and statistics regarding agent activities. The gathered status information and statistics may be displayed as part of a graphical user interface (GUI) that is provided by an application program.

The CTIMS gathers statistics regarding agent calling activities and maintains status or information regarding agents. These statistics may be passed to a client application program. The statistics provided by CTIMS may include statistics which are classified by call center, agent, supervisor or business client. The statistical information may also be categorized by call type, such as the number of outbound calls, the number of internal calls and the number of inbound calls that are handled by a particular agent. The useful activity performed by CTIMS is actually performed by a process running on a server computer.

One of the difficulties with the CTIMS approach discussed in the above-identified patent application is that the approach is not very resistant to failure of the CTIMS. If the CTIMS fails, there is no mechanism for gathering data regarding agent activities while the CTIMS remains in a failure state. As such, there is a need to enhance the ability of the monitoring system to withstand failure of the CTIMS.

SUMMARY OF THE INVENTION

The limitations of the prior art are overcome by the present invention which provides multiple instances of a CTIMS process. One of the processes is designated as a primary CTIMS process for handling client requests for status information and statistics regarding call center activity. The secondary CTIMS processes serve as redundant backups which may assume the role of the primary CTIMS process upon failure of the primary process. All of the CTIMS processes gather and archive information regarding calling activity in real time. The failover mechanism is provided for restarting a failed CTIMS process. The mechanism provides data synchronization with an active CTIMS process to ensure that the recently started CTIMS process has consistent information archived relative to the other active CTIMS processes.

In accordance with one aspect of the present invention, a method is practiced in a telecommunication system which has agents for handling calls and the computing environment. A primary service and a secondary service are provided for gathering information regarding calling activity by the agent. The primary service provides at least some of the gathered information to a client. When the primary service fails, the secondary service is automatically designated to provide at least some of the gathered information to the client rather than the primary service.

In accordance with another aspect of the present invention, multiple instances of a service are provided for archiving information regarding calling activity of agents in a telecommunications system. Upon the failure of a selected one of the multiple instances of service, the selected instance is restarted. In addition, the selected instance of the service is synchronized with a given one of the instances of the service so that the selected instance of the service archives up-to-date information regarding calling activity by the agent.

BRIEF DESCRIPTION OF THE DRAWINGS

An illustrative embodiment of the present invention will be described below relative to the following drawings.

DETAILED DESCRIPTION OF THE INVENTION

An exemplary embodiment of the present invention provides a failover mechanism for a computer/telephony integration monitoring server (CTIMS) within a call center. The failover mechanism allows a secondary or back-up CTIMS process to automatically service client needs upon the failure of a primary CTIMS process. This failover mechanism provides an enhanced ability for the monitoring system to withstand failure of the CTIMS process. The failover mechanism also includes a synchronization mechanism for synchronizing the data maintained by the secondary CTIMS process with the data that is maintained by the failed primary CTIMS process.

In the discussion below, it is assumed that the CTIMS processes are used within a call center. Nevertheless, those skilled in the art will appreciate that the present invention may be practiced in environments other than a call center. In particular, the present invention may be practiced in environments in which agents or other parties field calls or place calls and there is a need to gather information regarding the calling activities of those agents.

Figure 1:
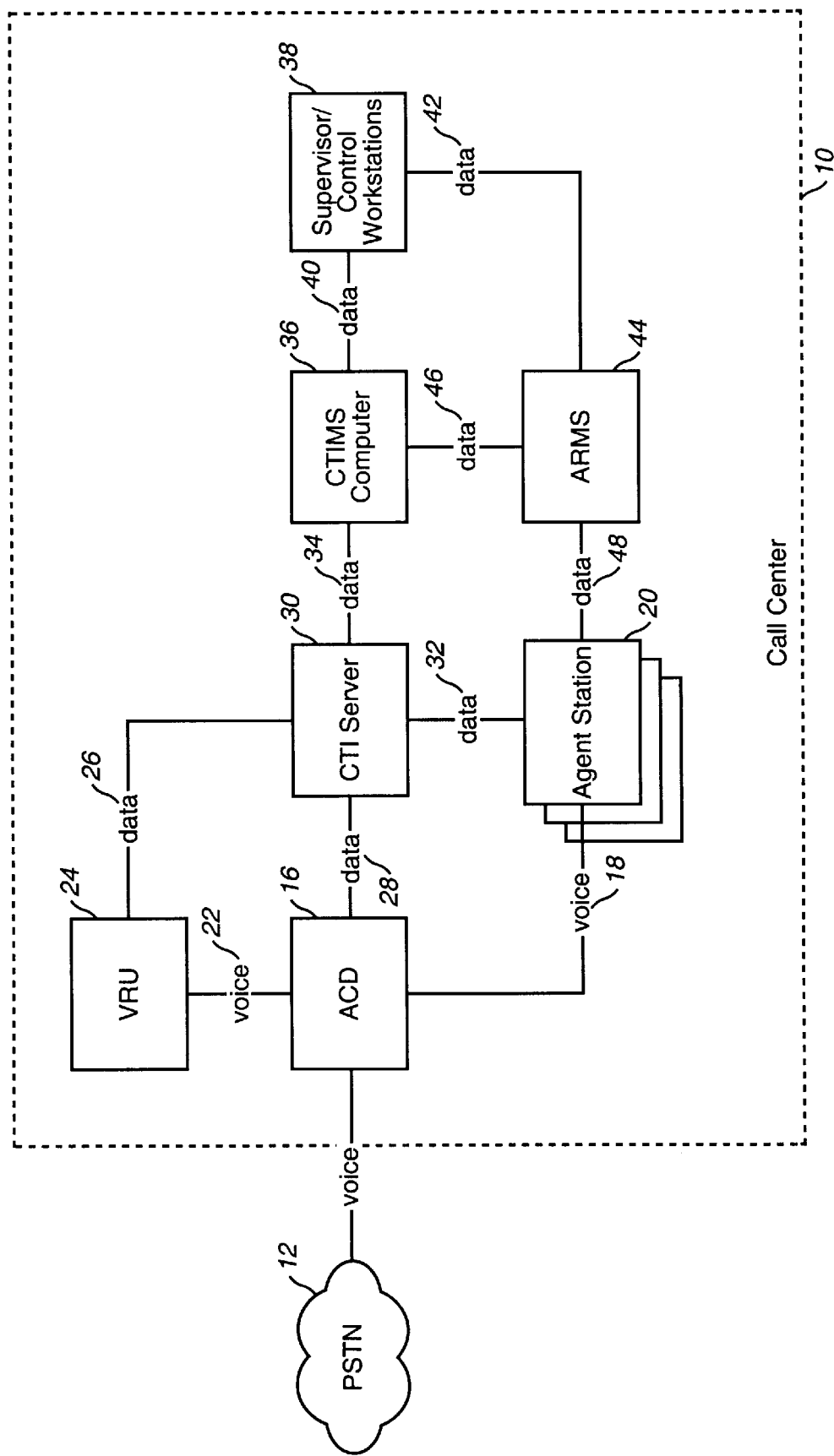
FIG. 1 is a block diagram of a call center which is suitable for practicing the illustrative embodiment of the present invention.

FIG. 1 is a block diagram which illustrates a portion of a telecommunications network that is suitable for practicing the illustrative embodiment of the present invention. The telecommunication network includes a call center 10 that is connected to a public switch telephone network (PSTN) 12 via a voice trunk 14. Those skilled in the art will appreciate that the call center 10 may also be alternatively connected to other types of networks from which calls may originate. The call center 10 includes an automatic call distributor (ACD) 16 or other switching mechanism for distributing incoming calls within the call center. The ACD 16 is connected via a voice trunk 18 to agent stations at which agents for handling calls are stationed. Each agent station 20 includes a workstation or a personal computer, a phone pad and a headset. The agents utilize these resources to process calls. The ACD 16 is also connected via a voice trunk 22 to a voice response unit (VRU) 24. The VRU 24 automates call processing. The VRU 24 may be used to collect information, such as account numbers, credit card numbers and service requests from callers. The VRU 24 is connected to a computer/telephone integration (CTI) server 30 via a data link 26. The CTI server 30 extracts call data from the ACD 16. In particular, the CTI server 30 extracts raw call data from the ACD 16 and processes the data into useful statistical data. The CTI server 30 distributes the data in the form of events. A suitable CTI server is the T-Server produced by Genesys Labs of San Bruno, Calif. The CTI server 30 is connected to the ACD 16 via data link 28 and is also connected to the agent stations 20 via a data link 32. A CTIMS computer 36 is connected to the CTI server 30 via data link 34. As described in more detail below, the CTIMS computer 36 runs CTIMS processes which compile statistical data that is collected from the CTI server 30 in real time or near real time into useful information for presentation and management at the supervisor/control workstations 38. For the purposes of the present discussion, a process is considered to be an executing instance of a program. It should be appreciated that the functionality of the CTIMS processes may be implemented as any of a number of different types of services. Moreover, the functionality need not be implemented in a process but also may be implemented in one or more threads.

The data that is gathered by the CTIMS process is utilized by one or more client application programs. The CTIMS process running on the CTIMS computer 36 registers with the CTI server 30 to receive events for each logical workstation. Every logical workstation within the call center has an associated number and the CTIMS process registers to receive events for each logical workstation number (LWN) within the call center. Examples of events that are output by the CTI server 30 include events indicating calls received, calls routed, calls answered and calls disconnected. The CTIMS process categorizes the events into groups, such as by agent, by supervisor, by call center, by business type and the like. The CTIMS process calculates statistics, such as average call handling times for agents.

The CTIMS computer 36 is connected to an automated resource management system (ARMS) 44 via data link 46. The ARMS 44 provides management of resource data for the call center. The ARMS 44 is largely a database on a server which includes interfaces for access by the CTIMS process and the supervisor/control workstations 38. Details regarding data archiving are described in U.S. patent application Ser. No. 09/039,618, entitled "Data Archiving of Call Data in a Call Center," filed Mar. 16, 1998, by C. Tran, W. Atkinson, G. Shankar, and C. Baxter, incorporated by reference herein.

The data links 26, 32, 34, 40, 42 and 48, which interconnect various components of the call centers, may be implemented as part of a local area network (LAN). Any type of suitable LAN may be utilized; however, in a preferred embodiment, the LAN for realizing these connections is an Ethernet LAN.

In order to appreciate the respective roles served by the above-described components, it is helpful to review call flow within the components of the call center 10. Initially, a call originates from the PSTN 12 and is sent over voice trunk 14 to the ACD 16. The ACD 16 decides where the call should be sent. The call is initially routed over voice trunk 22 to the VRU 24. The VRU 24 includes voice messaging facilities for obtaining information from the caller. As was mentioned above, the VRU 24 may collect information such as account numbers, credit card numbers and service requests. The gathered information is passed over data link 26 to the CTI server 30. The CTI server 30 passes the data to the agent workstation 20 which will be servicing the call. The ACD 16 then switches the call to the agent station 20 which is to handle the call. An application may be run on the agent workstation to provide a screen with the information that has been collected by the VRU 24 so that the agent at the agent station 20 has the collected information available for use while handling the call. The agent accepts the call and processes the call. Additional information from the caller may be retrieved from ARMS 44.

As was mentioned above, the ACD 16 outputs information regarding the routing and processing of calls over data link 28 to the CTI server 30. The CTI server 30 outputs events that are packaged in event structures which are forwarded to CTIMS processes on the CTIMS computer 36 over the data link 34. These events are processed and categorized by the CTIMS processes and sent over data link 40 to client programs at the supervisor/control workstations 38.

Multiple instances of CTIMS processes execute on the CTIMS computer 36. One of the process instances is designated as the primary CTIMS process and the remaining process instances are designated as secondary CTIMS processes. All of the CTIMS processes, both primary and secondary, receive and process data from the CTI server 30. The failover mechanism causes one of the secondary CTIMS processes to automatically take over as the primary CTIMS process if the primary CTIMS process fails. Moreover, each new CTIMS process which is initiated is automatically synchronized with a given instance of the CTIMS process so that it has both historical and current call data (i.e., the archived information is reconciled). As a result, the new CTIMS process can begin collecting and processing data from the CTI server 30 with an exact replica of the historical data from the previous processing.

Figure 2:
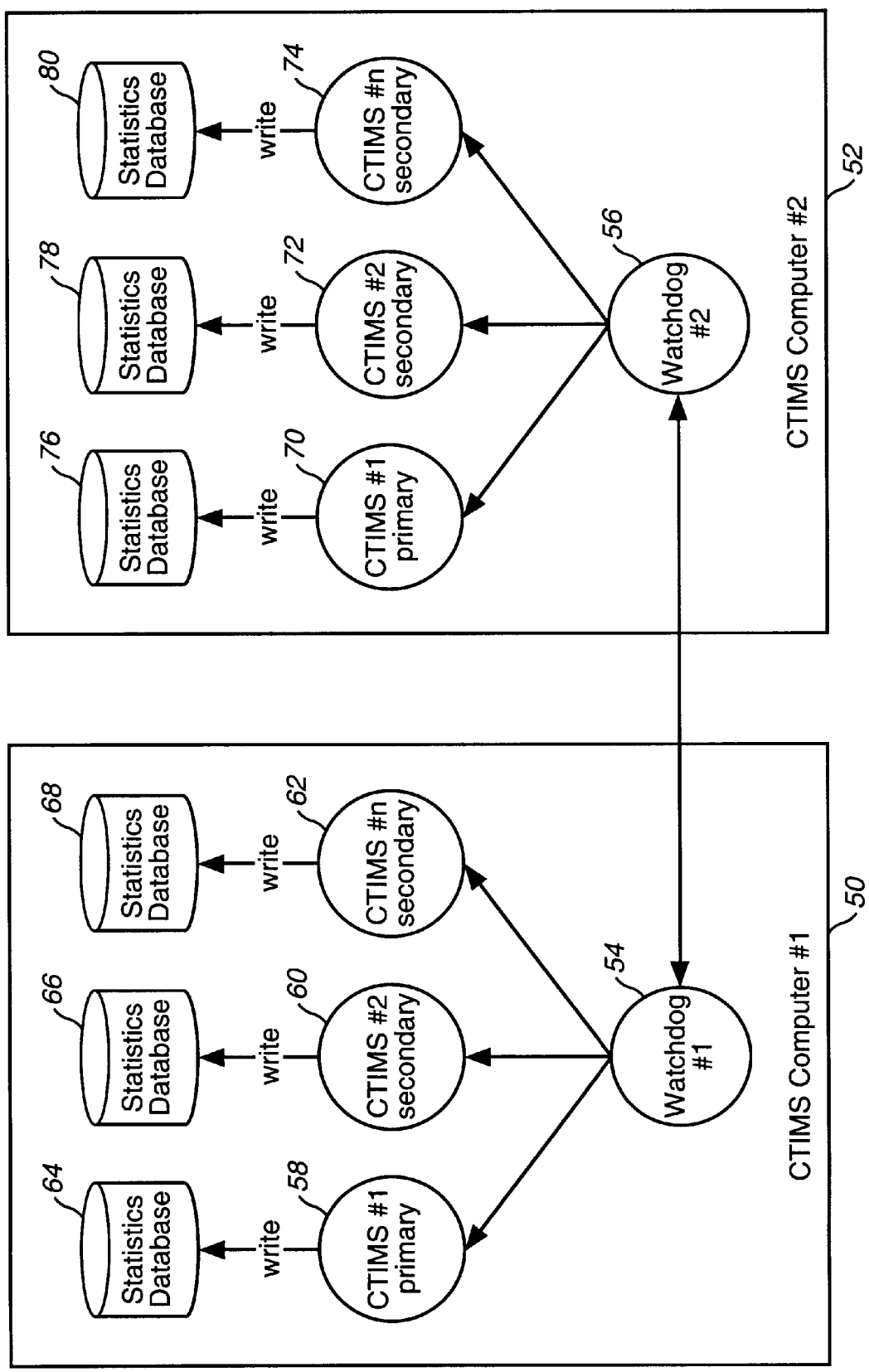
FIG. 2 is a logical diagram with the organization of the CTIMS processes and watchdog processes in the illustrative embodiment of the present invention.

FIG. 2 illustrates an example of the logical process architecture for the failover mechanism. To provide enhanced fault tolerance, dual CTIMS computers 50 and 52 are utilized for a given call center. The computers 50 and 52 are configured in a redundant manner. Multiple instances of the CTIMS process run on each computer. Those skilled in the art will appreciate that any number of CTIMS computers and any number of CTIMS process instances may be utilized. The CTIMS computer 50 includes a primary CTIMS process 58, and n−1 secondary CTIMS processes 60 and 62. Each CTIMS process has an associated copy of a statistics database 64, 66 and 68, respectively, that holds the gathered statistics, status data and other information gathered by the associated CTIMS process. In a similar fashion, CTIMS computer 52 has primary CTIMS process 70 and secondary CTIMS processes 72 and 74. Each of these CTIMS processes also has a copy of the statistics database 76, 78 and 80.

All of the CTIMS processes 58, 60, 62, 70, 72 and 74 are active CTIMS processes. These CTIMS processes communicate with each other via TCP/IP sockets. A socket is the type of file that is used for network communication between processes. A socket may also be viewed as an endpoint of communication that is referred to by descriptor. Two processes can create a socket and then connect the two endpoints of the socket to produce a reliable byte stream.

Each CTIMS process collects raw data as events from the ACD 16 via the CTI server 30. When a CTIMS process receives an event, the event is processed to obtain statistical data on the performance of the agent, the business and the call center associated with the event. Each CTIMS process writes the statistical data to its own statistics database 64, 66, 68, 70, 78 and 80. The contents and format of this database are described in more detail in the copending application entitled "Computer/Telephone Integration Monitoring Server," application Ser. No. 08/940,547, which is explicitly incorporated by reference herein.

A watchdog process 54 and 56 runs on each CTIMS computer 50 and 52 to serve as a process monitor. The watchdog process is a daemon process that monitors the health of each active CTIMS process. A daemon process is a background process that performs useful work for other processes, e.g., handling low level operating system tasks. A daemon process, as used in this context, is like that found in a UNIX operating system. If one of the CTIMS processes fails, the watchdog immediately detects the failure and attempts to restart the failed CTIMS process. In addition, a secondary CTIMS process is then utilized by clients to ensure that the clients are provided with the necessary statistical and status data. As will be described in more detail below, a configuration file is provided to identify the primary CTIMS processes and the secondary CTIMS processes on a given CTIMS computer. Each CTIMS process is identified by its associated TCP/IP socket identifier.

In addition to monitoring the CTIMS processes, the watchdog also monitors other watchdog processes on other CTIMS computers via the TCP/IP sockets. For example, watchdog 54 monitors watchdog 56 and vice versa.

An object-oriented architecture may be utilized for the monitoring system in the illustrated embodiment of the present invention. For example, business objects of a business object class may be provided to encapsulate information regarding business clients at the call center. Agent objects may be utilized to hold information regarding agents within the call center. A center object may be provided to hold information regarding the call center. A configuration object may be provided to hold configuration information (such as the designation of which CTIMS process is primary and which CTIMS processes are secondary). The center objects, agent objects and business objects may be encapsulated within a resyncData object class. This object is of an abstract base class which captures similar abilities among the agent, center and business objects. The data may be formatted, sent and received for resynchronization purposes, as will be discussed in more detail below.

Figure 3:
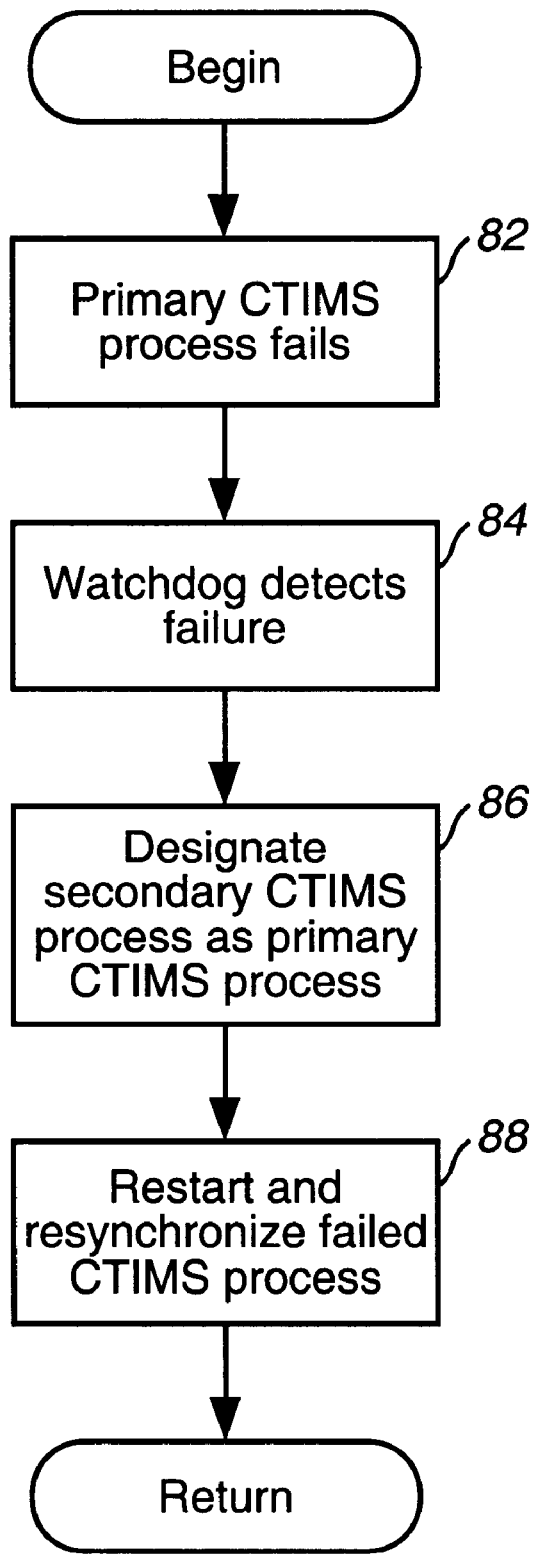
FIG. 3 is a flow chart that provides an overview of the activities which are performed by the failover mechanism in the illustrative embodiment of the present invention.

FIG. 3 is a flowchart which provides an overview of the steps that are performed by the failover mechanism in the illustrative embodiment of the present invention when a primary CTIMS process fails. Initially, the primary CTIMS process, such as CTIMS process 58 in FIG. 2, fails (step 82 in FIG. 3). The watchdog that monitors the primary CTIMS process (e.g., watchdog 54) then detects the failure of the primary CTIMS process (step 84 in FIG. 3). In response to the detection of the failure a number of additional steps may be performed. First, one of the secondary CTIMS 60 and 62 is designated to immediately act as the primary CTIMS process (step 86 in FIG. 3). This designation may be specified in the configuration file of the client which uses the service CTIMS process, or alternatively may occur sequentially beginning with the first secondary CTIMS process and continuing until the nth CTIMS process until a CTIMS secondary process is found that can assume the role of primary CTIMS process. The watchdog 54 then initiates a process to restart and resynchronize the failed primary CTIMS process (step 88 in FIG. 3). The restart and resynchronization process will be described in more detail below.

Figure 4:
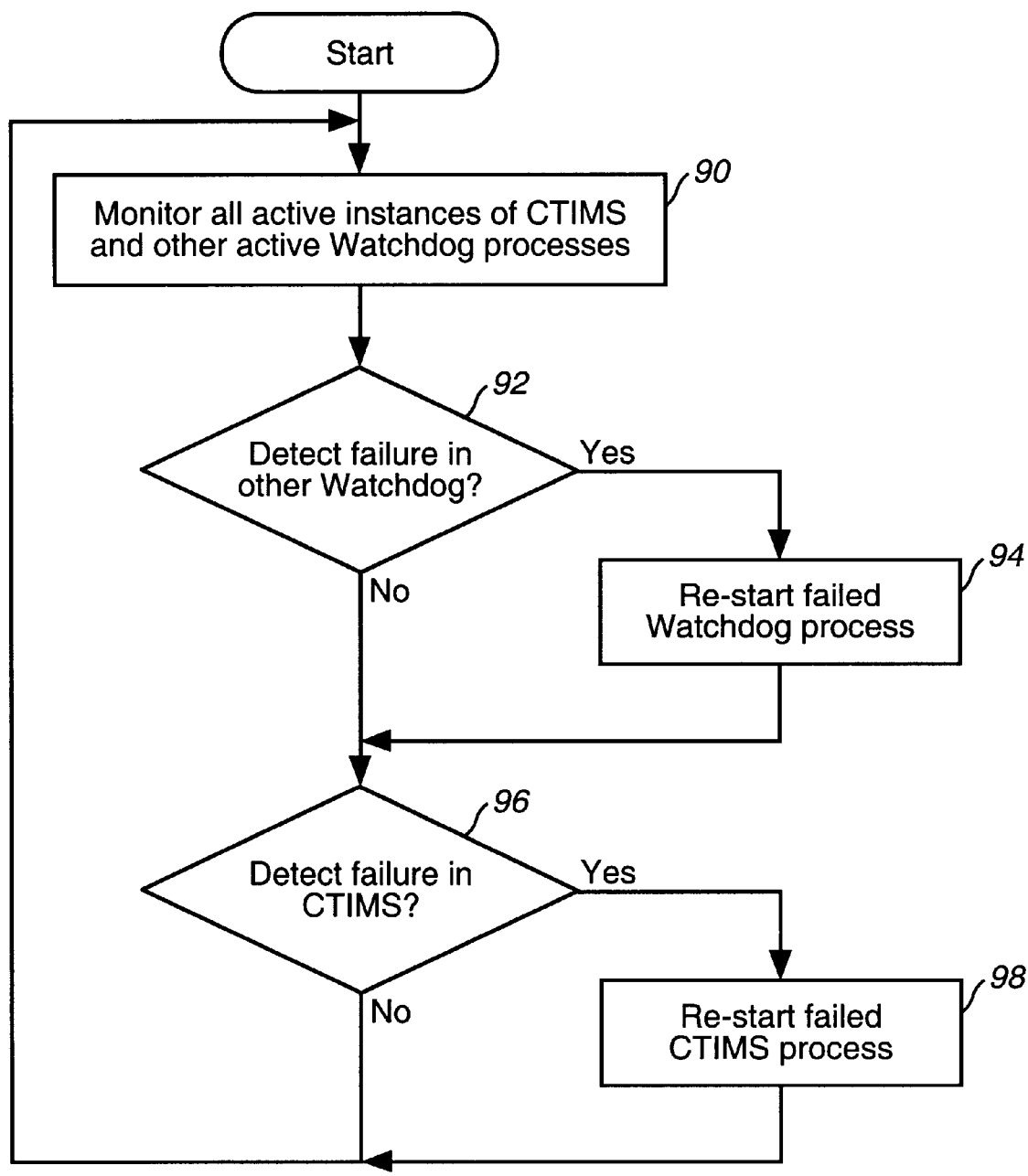
FIG. 4 is a flow chart illustrating the steps which are performed by a watchdog process in the illustrative embodiment of the present invention.

As was discussed above, the watchdog process monitors not only CTIMS processes but also other watchdog processes. FIG. 4 is a flowchart illustrating the steps performed by the watchdog process. The watchdog monitors all active instances of CTIMS processes and other active designated watchdog processes (step 90 in FIG. 4). If the watchdog process detects a failure in the other watchdog process that it monitors (see step 92 in FIG. 4), the watchdog process takes steps to restart the failed watchdog process (step 94 in FIG. 4). If the watchdog detects a failure in a CTIMS process (either primary or secondary), the watchdog will seek to restart the failed CTIMS process (step 98 in FIG. 4).

Figure 5A:
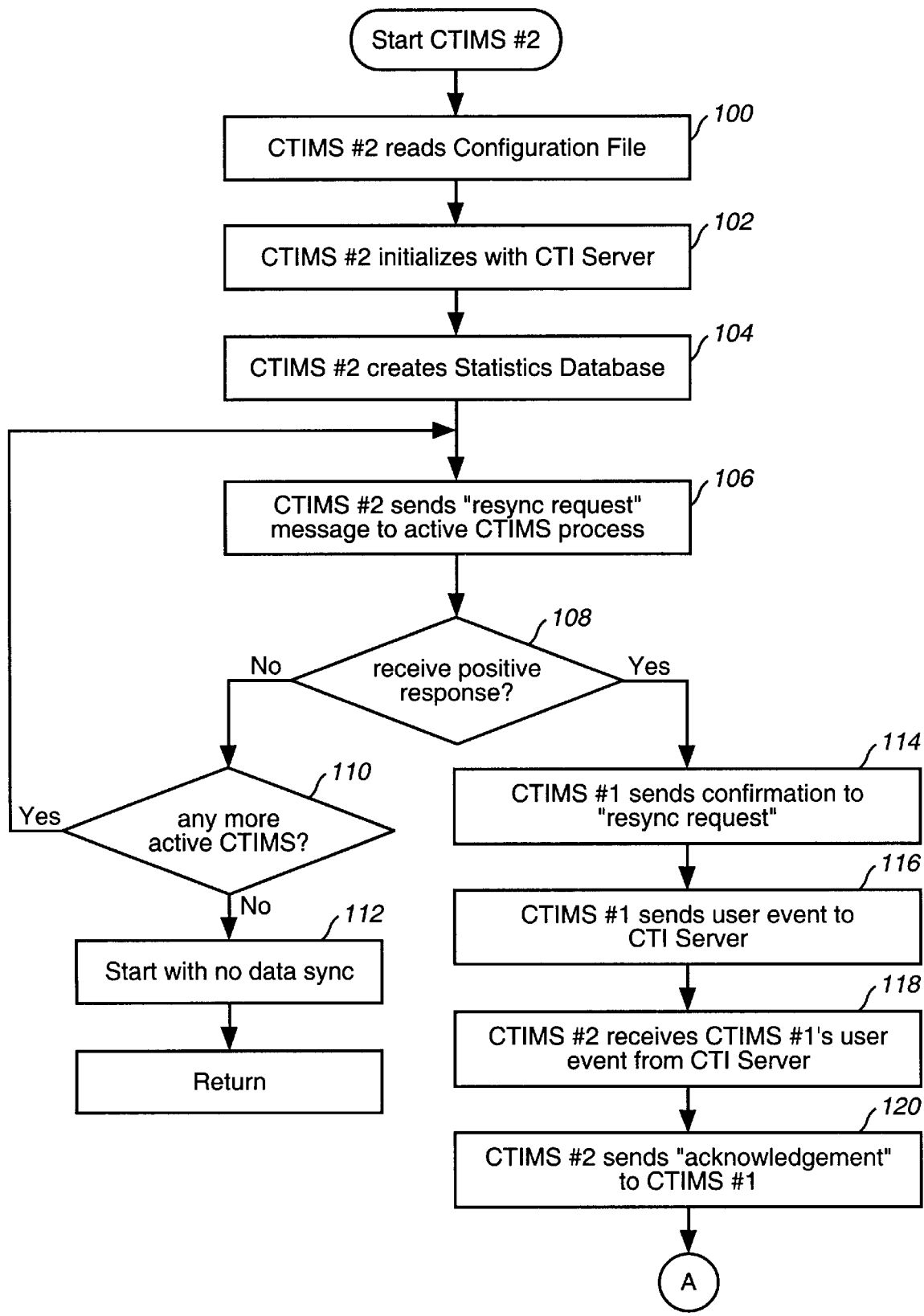
FIGS. 5A and 5B are flow charts illustrating the steps which are performed to restart a failed CTIMS process.
Figure 5B:
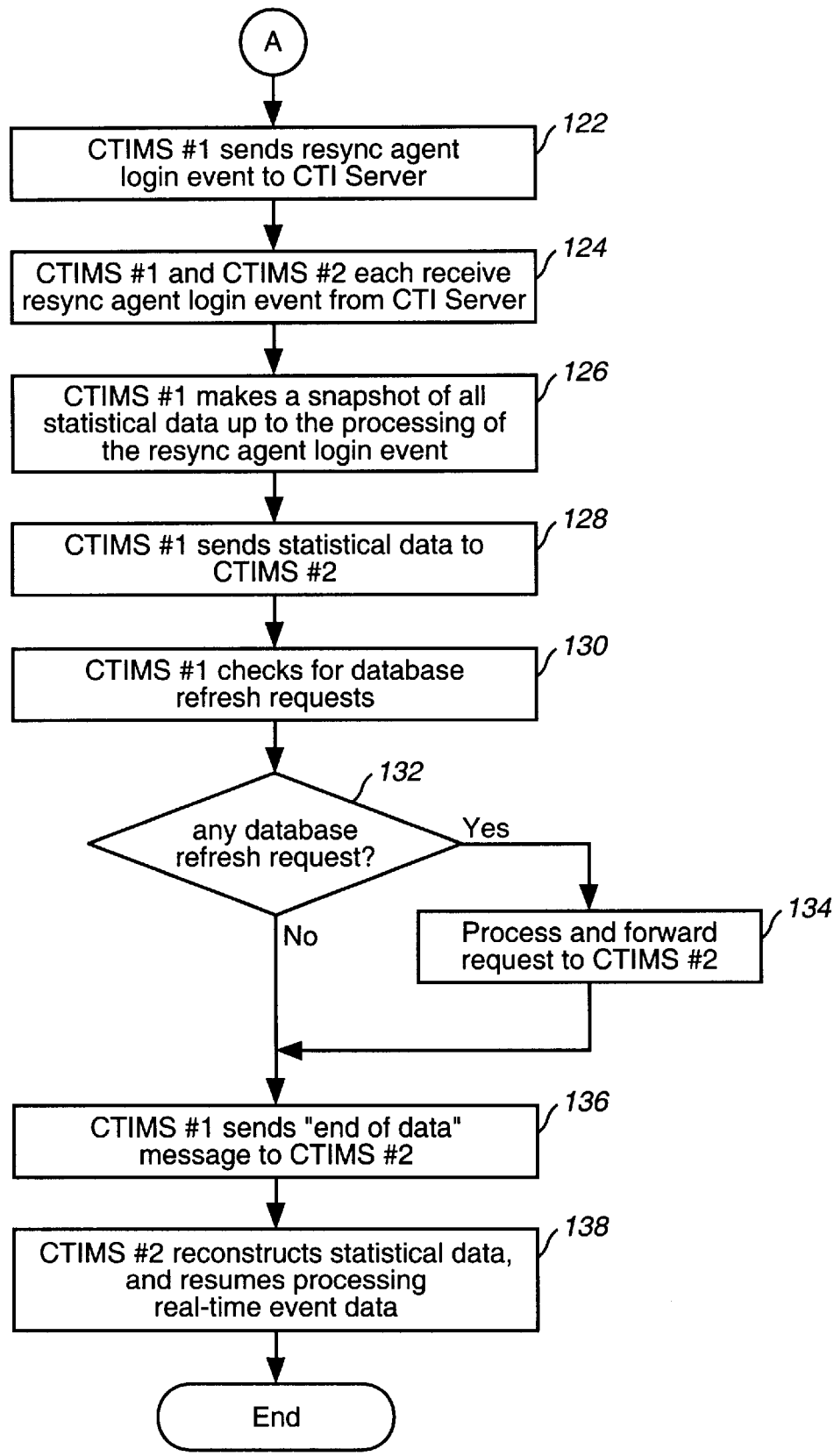
Figure 6:
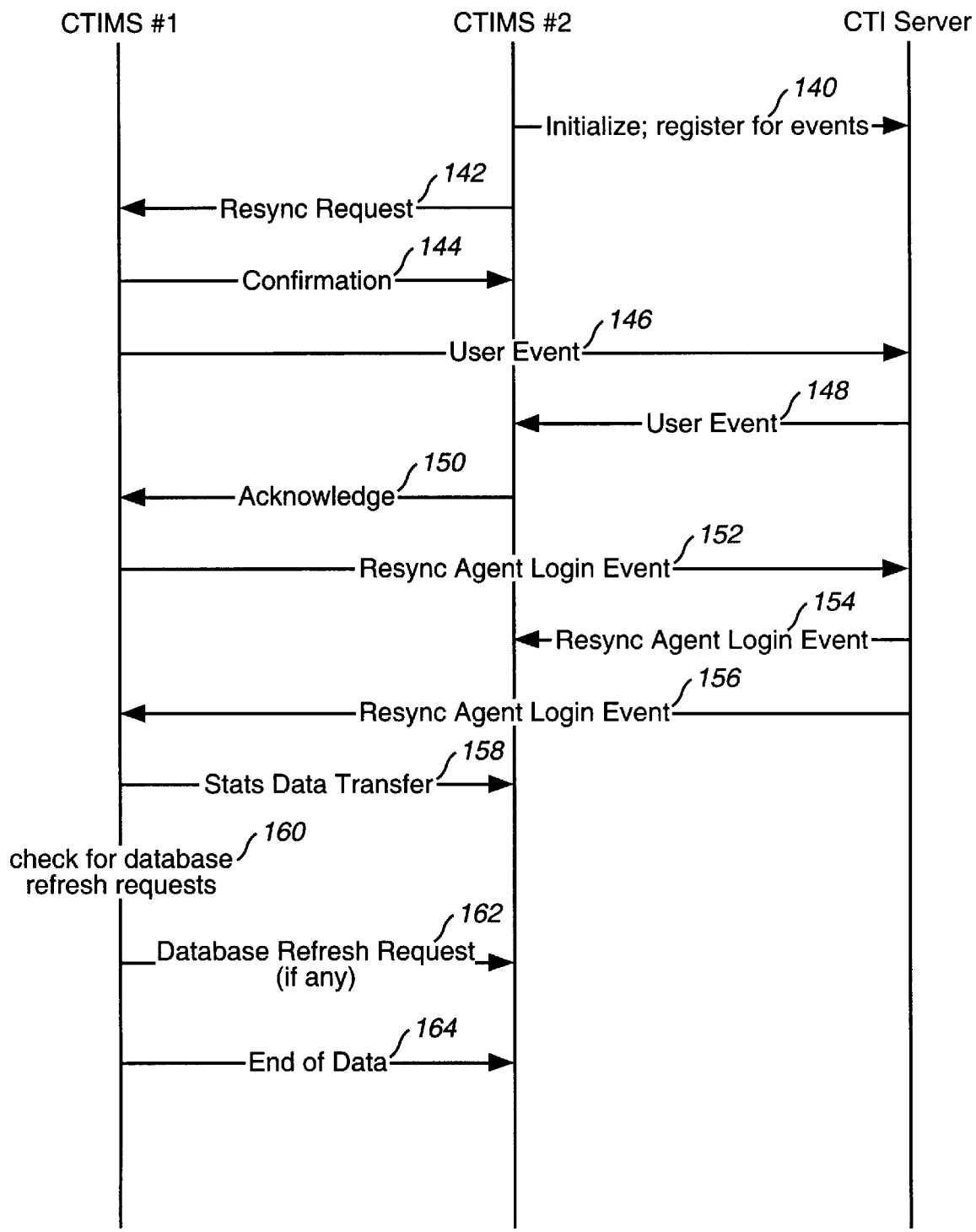
FIG. 6 is a diagram that illustrates the data flow which occurs during the restarting of the CTIMS process.

FIGS. 5A and 5B show the steps which are performed to start a CTIMS process. FIG. 6 shows the data flow among components in starting a CTIMS process. This may occur when a CTIMS process is initially begun or when a CTIMS process is reinitiated after failure. The CTIMS process must synchronize itself with another active CTIMS process. For purposes of the discussion below, it is assumed that CTIMS #1 is a primary CTIMS process and CTIMS #2 is a secondary CTIMS process which is being started. Initially, the CTIMS #2 process is started by a watchdog process, a user or a system initialized program. The CTIMS #2 then reads a configuration file which identifies the LWNs for which it is to register (step 100 in FIG. 5A). The configuration file also identifies an active CTIMS process with which it is to synchronize. In this case, the active process is CTIMS #1.

CTIMS #2 then initializes itself (see 140 in FIG. 6) with the CTI server 30 (step 102 in FIG. 5A). This entails registering for certain events for certain LWNs. Preferably, CTIMS #2 registers for the receipt of all events for all LWNs within the call center 10. CTIMS #2 creates a statistics database to which to write all stored and processed event data (step 104 in FIG. 5A). The creation of the statistics database may entail allocating shared memory that contains an already existing block of data or alternatively contains no data.

CTIMS #2 begins the synchronization by sending a Resync Request message 142 (FIG. 6) to the designated active CTIMS process to which it is synchronized (step 106 in FIG. 5A). CTIMS #2 awaits a positive response from CTIMS #1. If a positive response is not received (see step 108 in FIG. 5A), CTIMS #1 determines whether there are any other active CTIMS processes which are available for synchronization by examining the data in the configuration file (step 110 in FIG. 5A). If there is no additional active CTIMS processes, CTIMS #2 will be started with no data synchronization (step 112 in FIG. 5A). If there are more active CTIMS processes (see step 110 in FIG. 5A), CTIMS #2 sends a resync request to the next active CTIMS process (in sequence or as designated by the configuration file) and awaits a positive response (see steps 106 and 108 in FIG. 5A). When a positive response is returned to CTIMS #2, CTIMS #1 sends a confirmation 144 (FIG. 6) to the resync request (step 114 in FIG. 5A).

CTIMS #1 then sends a user event 146 (FIG. 6) to the CTI server 30 (step 116 in FIG. 5A). This user event 146 indicates that the registration of events for CTIMS #2 has been completed and synchronization may begin. The user event 148 is sent from the CTI server to CTIMS #2 (step 118 in FIG. 5A). CTIMS #2 then sends an acknowledgment 150 (FIG. 6) to CTIMS #1 (step 120 in FIG. 5A). The acknowledgment informs CTIMS #1 that CTIMS #2 is ready for data synchronization.

CTIMS #1 initiates the data resynchronization by sending a Resync Agent Login Event 152 (FIG. 6) to the CTI server 30 (step 120 in FIG. 5B). This event 152 is used as a reference point relative to the data synchronization between CTIMS #1 and CTIMS #2. In particular, CTIMS #2 needs to receive from CTIMS #1 all historical data up to the reference point associated with the Resync Agent Login Event 152. CTIMS #1 and CTIMS #2 each receive a Resync Agent Login Event from the CTI server 30 (step 124 in FIG. 5B). CTIMS #1 then makes a snapshot of all statistical data up to the reference point associated with the Resync Agent Login Event (step 126 in FIG. 5B). This snapshot is encapsulated into the resyncData object, discussed above. The snapshot of statistical data is then sent from CTIMS #1 to CTIMS #2 (step 128 in FIG. 5B). The initiation of this data transfer is identified by reference number 158 in FIG. 6.

As certain database changes may have occurred during data transfer of the snapshot from CTIMS #1 to CTIMS #2, CTIMS #1 should preferably take steps to ensure that all the data is current and in synchronization with CTIMS #2. As such, CTIMS #1 checks for database refresh request 160 (FIG. 6) which may have been received during the data transfer of step 128 (step 130 in FIG. 5B). If there are database refresh requests (see step 132 in FIG. 5B), they will have been enqueued and any database refresh requests are then sent from CTIMS #1 to CTIMS #2 (134 in FIG. 5B). Such requests to update the statistics database are enqueued by CTIMS #1 while it is transferring the snapshot to CTIMS #2. After the transferring of the snapshot of statistical data is complete, CTIMS #1 checks its queue to determine if there are any requests which need to be forwarded to CTIMS #2. When all the statistical data has been sent from CTIMS #1 to CTIMS #2, and all the refresh requests have been sent as well, CTIMS #1 sends an end of data message 164 (FIG. 6) to CTIMS #2 (step 136 in FIG. 5B). CTIMS #2 then reconstructs the statistical data and resumes processing (step 138 in FIG. 5B). CTIMS #2 is now synchronized with CTIMS #1 and the other CTIMS processes.

While the present invention has been described with reference to a preferred embodiment thereof, those skilled in the art will appreciate that various changes in the form and in the detail may be made without departing from the intended scope of the present invention as defined in the appended claims. For instance, the restarting and synchronization protocols may differ from these discussed above. Moreover, sets of primary and secondary CTIMS processes need not run on associated machines but rather may be distributed across multiple computer systems.

What is claimed is:

1. In a telecommunications system having agents for handling calls and a computing environment, a method for monitoring the system comprising the computer-implemented steps of:

providing a primary service and a secondary service for gathering information regarding calling activity by the agents, where the primary service provides at least some of the gathered information to a client; and upon failure of the primary service, automatically designating that the secondary service provide at least some of the gathered information to the client rather than the primary service.

2. The method of claim 1 wherein the primary service and the secondary service each maintain redundant copies of the information that is gathered regarding calling activity by the agents.

3. The method of claim 1 wherein the primary service is a first process and the secondary service is a second process.

4. The method of claim 3 wherein the primary service and the secondary service are concurrently active processes.

5. The method of claim 1 wherein the information that is gathered regarding calling activity includes statistical data.

6. The method of claim 1, further comprising the step of providing a watchdog service that detects whether the primary service has failed.

7. The method of claim 1, further comprising the step of using the watchdog service to monitor for failure of the secondary service.

8. The method of claim 1, further comprising the step of providing an additional secondary service for gathering information regarding calling activity by the agents.

9. The method of claim 1 wherein the computing environment includes a computer system and wherein the primary service and the secondary service both run on the computer system.

10. The method of claim 1 wherein the agents and the computing environment are within a call center.

11. The method of claim 1, further comprising the step of restarting the primary service after the failure.

12. The method of claim 11, further comprising the step of reconciling the information gathered by the secondary service with the information gathered by the primary service upon restarting of the primary service.

13. In a telecommunications system having agents for handling calls and a computing environment, a computer-implemented method for monitoring the system comprising the steps of:

providing multiple instances of a service for archiving information regarding calling activity by the agents;

upon failure of a selected one of the multiple instances of the service,
  (i) restarting the selected instance of the service;
  (ii) synchronizing the selected instance of the service with a given one of the instances of the service so that the selected instance of the service archives up-to-date information regarding calling activity by the agents.

14. The method of claim 13 wherein the synchronizing comprises copying information archived by the given instance of the service for archiving by the selected instance of the service.

15. The method of claim 13 wherein the instances of the service archive the information regarding calling activity by the agents in real time.

16. The method of claim 13 wherein each instance of the service is a separate instance of a process.

17. The method of claim 13 wherein the information includes statistics.

18. In a telecommunications system wherein agents process telephone calls, a computer system comprising:

a primary service and a secondary service for gathering information regarding calling activities by the agents, said primary service providing at least some of said information to a client;

a monitor for monitoring for failure of the primary service; and a failover mechanism for designating that the secondary service provides at least some of said information to the client rather than the primary service given the failure of the primary service.

19. The computer system of claim 18, further comprising a data synchronizer for synchronizing the information gathered by the secondary service with the information gathered by the primary service upon recovery of the primary service from failure.

20. In a telecommunications system having agents for handling calls and a computing environment, a computer-readable medium holding computer-executable instructions for performing a method comprising the computer-implemented steps of:

providing a primary service and a secondary service for gathering information regarding calling activity by the agents, where the primary service provides at least some of the gathered information to a client; and upon failure of the primary service, automatically designating that the secondary service provide at least some of the gathered information to the client rather than the primary service.

21. The computer-readable medium of claim 20 wherein the primary service and the secondary service each maintain redundant copies of the information that is gathered regarding calling activity by the agents.

22. The computer-readable medium of claim 20 wherein the primary service is a first process and the secondary service is a second process.

23. The computer-readable medium of claim 22 wherein the primary service and the secondary service are concurrently active processes.

24. The computer-readable medium of claim 20 wherein the information that is gathered regarding calling activity includes statistical data.

25. The computer-readable medium of claim 20 wherein the method further comprises the step of providing a watchdog service that detects whether the primary service has failed.

26. The computer-readable medium of claim 25 wherein the method further comprises the step of using the watchdog service to monitor for failure of the secondary service.

27. The computer-readable medium of claim 20 wherein the method further comprises the step of providing an additional secondary service for gathering information regarding calling activity by the agents.

28. The computer-readable medium of claim 20 wherein the computing environment includes a computer system and wherein the primary service and the secondary service both run on the computer system.

29. The computer-readable medium of claim 20 wherein the agents and the computing environment are within a call center.

30. The computer-readable medium of claim 20 wherein the method further comprises the step of restarting the primary service after the failure.

31. The computer-readable medium of claim 20 wherein the method further comprises the step of reconciling the information gathered by the secondary service with the information gathered by the primary service upon restarting of the primary service.

32. In a telecommunications system having agents for handling calls and a computing environment, a computer-readable medium holding computer-executable instructions for performing a computer-implemented method for the system comprising the steps of:

providing multiple instances of a service for archiving information regarding calling activity by the agents;

upon failure of a selected one of the multiple instances of the service,
(i) restarting the selected instance of the service;
(ii) synchronizing the selected instance of the service with a given one of the instances of the service so that the selected instance of the service archives up-to-date information regarding calling activity by the agents.

33. The computer-readable medium of claim 32 wherein the synchronizing comprises copying information archived by the given instance of the service for archiving by the selected instance of the service.

34. The computer-readable medium of claim 32 wherein each instance of the service is a separate instance of a process.

35. The computer-readable medium of claim 32 wherein the information includes statistics.

* * * * *